United States Patent [19]
Tsuruta et al.

[11] 3,978,480
[45] Aug. 31, 1976

[54] METHOD OF IDENTIFYING THE PATTERNS OF RADAR SIGNALS

[75] Inventors: Sueichi Tsuruta, Fujisawa; Hiroharu Nishiguchi, Tokyo; Takamura Takigawa, Hino; Shiro Hikawa, Mitaka; Kazunori Kitasumi, Chigasaki, all of Japan

[73] Assignees: Mitsui Shipbuilding and Engineering Co., Ltd.; Kyoritsu Dempa Co., Ltd., both of Japan

[22] Filed: May 28, 1974

[21] Appl. No.: 473,665

[30] Foreign Application Priority Data
Aug. 15, 1972 Japan.............................. 48-90992

[52] U.S. Cl.............................. 343/5 DP; 315/378
[51] Int. Cl.² ......................................... G01S 9/00
[58] Field of Search .................. 343/5 DP; 315/378

[56] References Cited
UNITED STATES PATENTS

| | | | |
|---|---|---|---|
| 3,325,806 | 6/1967 | Wilmot et al. | 343/5 DP |
| 3,353,177 | 11/1967 | Wilmot | 343/5 DP |
| 3,412,397 | 11/1968 | Evans | 343/5 DP |
| 3,684,915 | 8/1972 | Gangawere | 315/378 |
| 3,836,964 | 9/1974 | Evans | 343/7 A |

Primary Examiner—Maynard R. Wilbur
Assistant Examiner—S. C. Buczinski
Attorney, Agent, or Firm—Charles W. Helzer

[57] ABSTRACT

In a PPI display type radar system wherein a sector shaped unit scanning surface is established in a scanning plane and a unit scanning surface is shifted progressively in the radial and circumferential directions to seach the received pattern for judging a target. The received pattern is identified by dividing the unit scanning surface into a plurality of annular sections derived from a plurality of concentric circles. The scanning unit for scanning surfaces having approximately the same area over the entire scanning surface is designed in such a manner that the ratio (percentage of extraction) of a number of sampled scanning beams to the number of actual scanning beams is a maximum when scanning an annular section which is located most remotely from the center. The percentage of extraction is gradually decreased toward the center so that the percentage of extraction becomes a minimum 1/n (where n is an integer) when scanning an annular section closest to the center. Scanning the received signal in each unit scanning surface with a scanning beam at equal numbers in the radial and circumferential directions and at substantially the equal spacing obtains a pattern of the received signal in accordance with the presence or absence thereof, and the target may be judged in accordance with the size of the pattern.

4 Claims, 16 Drawing Figures

NO.1 MATRIX

| | | | | | | | | | | |
|---|---|---|---|---|---|---|---|---|---|---|
| S1 | Sθ2 | | | -θ1 | θ1 | +θ1 | | | Pθ9 | P10 |
| Sr1 | S2 | Sθ3 | | -θ2 | θ2 | +θ2 | | Pθ8 | P9 | Pr10 |
| | Sr2 | S3 | Sθ4 | -θ3 | θ3 | +θ3 | Pθ7 | P8 | Pr9 | |
| | | Sr3 | S4 | -θ4 | θ4 | +θ4 | P7 | Pr8 | | |
| -r1 | -r2 | -r3 | -r4 | S5 | θ5 | P6 | -r7 | -r8 | -r9 | -r10 |
| R1 | R2 | R3 | R4 | R5 | C | R6 | R7 | R8 | R9 | R10 |
| +r1 | +r2 | +r3 | +r4 | P5 | θ6 | S6 | +r7 | +r8 | +r9 | +r10 |
| | | Pr3 | P4 | -θ7 | θ7 | +θ7 | S7 | Sr8 | | |
| | Pr2 | P3 | Pθ4 | -θ8 | θ8 | +θ8 | Sθ7 | S8 | Sr9 | |
| Pr1 | P2 | Pθ3 | | -θ9 | θ9 | +θ9 | | Sθ8 | S9 | Sr10 |
| P1 | Pθ2 | | | -θ10 | θ10 | +θ10 | | | Sθ9 | S10 |

VIDEO INPUT → (arrows pointing to each row)

FIG.9b

NO. 2 MATRIX

| 0 | 1 | 1 | 1 | 1 | C | 1 | 1 | 1 | 0 |

A = B

| 0 | 1 | 1 | 1 | 1 | C | 1 | 1 | 0 | 0 |

CIRCUMFERENTIAL BIT ≈ 0.3°
RADIAL BIT X 60m

METHOD OF IDENTIFYING THE PATTERNS OF RADAR SIGNALS

BACKGROUND OF THE INVENTION

This invention relates to a method of identifying the patterns of radar signals. The pattern of radar signals has been identified by the visual inspection of the operator, but a method of processing radar signal informations by means of an electronic computer has recently been developed. However, identification of the pattern by a standard computer for the purpose of locating targets from radar signals is not advantageous from the standpoints of economy and processing speed.

SUMMARY OF THE INVENTION

It is an object of this invention to provide a novel method of accurately and promptly identifying the pattern of the received signal of a radar system.

Further object of this invention is to provide a novel method which can locate and identify a remote target with a simple system.

In accordance with this invention, a method of judging a target with a radar system is provided wherein a unit scanning surface is established which is bounded by two radii spaced from each other a predetermined angle and two circular arcs spaced from each other a predetermined distance in the radial direction in a scanning plane of a polar scanning type radar system. The size of the unit scanning surface is determined such that the target corresponding to a received pattern in the unit scanning surface can be judged from the size of the pattern, and the unit scanning surface is shifted progressively in the radial and circumferential directions to search the received pattern thereby judging the target. There is provided a method of identifying the received pattern comprising the steps of dividing the entire surface being scanned into a plurality of unit scanning surfaces formed by annular sections from plurality of concentric circles having different radii. Scanning the unit scanning surfaces having substantially the same area of the entire surface being scanned in a manner such that the ratio (percentage of extraction) of the number of sampled scanning beams to the number of actual scanning beams is a maximum when scanning an annular unit scanning surface section which is located most remotely from the center. Conversely, the percentage of extraction is gradually decreased as the scanning unit surface being scanned moves toward the center so that the percentage of extraction becomes a minimum of 1/n (where n is an integer) when scanning an annular unit scanning surface section closest to the center where by definition the center identifies the location of the scanning radar system. By scanning the received signal in each unit scanning surface with a scanning beam at equal increments in the radial and circumferential directions and scanning the respective unit scanning surfaces at substantially equal spacings, is obtained a pattern of the received signal in accordance with the presence or absence of a target, and the target can be judged in accordance with the size of the pattern.

When processing the received signals in the scanning surface, substantially all of the received signals are arranged for quick analysis in a pattern consisting of a circumferential line passing through the center of the scanning surface, a radial line passing through the center and two diagonal lines also passing through the center, and the target is judged from the size of the pattern.

To simplify the judgement of the target, the signals arranged in said pattern consisting of four lines are rearranged into another pattern consisting of a circumferential line and a radial line and the target is judged from the size of the another pattern.

As is well known, the radar signal reflected from a target to be searched contains a number of noise signals, so that in order to process only effective signals it is necessary to remove such noise signals.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
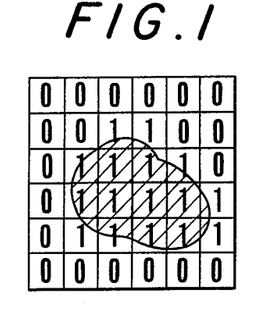
FIG. 1 is a diagram for explaining the principle of a method of identifying the pattern of received radar signals.

FIG. 1 of the accompanying drawings shows the principle of a method of identifying the pattern of a received radar signal. For the purpose of processing the pattern with a standard electronic computer the shaded target pattern and the remaining portions of the graph are partitioned into a plurality of square blocks and the blocks in the shaded area are designated by "1" and the blocks in the not shaded area by 0. Then, the entire area is scanned, the results of scanning are stored and then read out for identifying the contour of the shaded area designated by 1. According to the PPI display type radar commonly used in the art, even when a target appearing on a portion of the screen was to be detected for identifying the pattern by investigating the size, contour etc. of the target, the whole area of a wide display screen was uniformly scanned. Accordingly, such a method was not advantageous.

In judging, with a ship radar for example, whether the reflected radar signal represents a ship or land, a maximum unit scanning area of about 600 to 700 square meters (m²) has been used by taking into consideration the fact that the length of a large ship amounts to 400 meters or more. Further, according to the PPI display type radar system which has been used most widely at present a polar scanning system was used and the width of the scanning area increased with the distance even with the same angle of scanning. For this reason, it was necessary to scan substantially the same area over the entire scanning range.

To obviate these disadvantages, according to this invention, the actual radar scanning beams are intermittently sampled to vary the percentage of extraction of sampled radar scanning beams as they approach the center of the scanning range (i.e. location of the scanning radar system), thus assuring scanning surfaces of substantially the same area. By the actual radar scanning beams is meant the actual, highly directional, finely focused beams of pulsed high frequency radio waves that are transmitted and received back in the form of a returned signal by the scanning radar system. By the sampled scanning beams is meant those actual radar scanning beam returned signals which are extracted (chosen) for signal processing in accordance with the invention.

Figure 2:
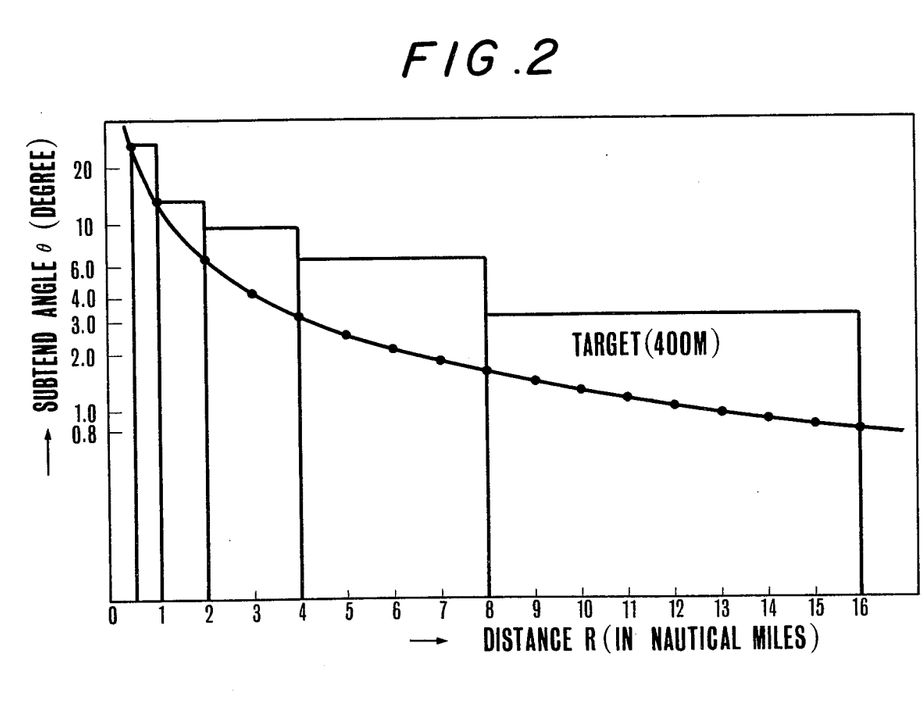
FIG. 2 is a graph showing the percentage of extraction.

FIG. 2 is a graph showing the subtend angle $\theta$ and the distance to a target in which the ordinate represents the subtend angle $\theta$ of the target and the abscissa the distance R to the target. The curve was plotted by assuming a target having a length of 400 m and lying along a circle of the scanning surface. The areas bounded by thick lines are varied stepwisely in accordance with the distance to the target so as to cover a length of 400 m in the scanning surface. Thus it is seen that within a distance range of 16 – 8 nautical miles, a ship target 400 meters long will have a subtend angle $\theta$ of about 1.8° to 1.6°. This is in contrast to the same ship target at a distance range of from 0.5 to 1.0 nautical miles which will have a subtend angle $\theta$ of about 14° to 26°.

What size the unit scanning surface should have will now be considered. In determining the range utilized for the identification of the pattern it is necessary to identify at high accuracies not only the present day largest ships but also smaller ships. For example, a large cargo ship has an effective reflective area of 14,400 m² which corresponds to a plane having a length of 400 m and a height 36 m. Generally, the reflected signal from a target has a Gauss distribution in which the signal reflected from the longitudinal center of the ship has the largest value. For this reason, it has been necessary to use signals above a predetermined level. In other words, the measured length is shorter than the actual length of the ship. To perform more accurate measurement, it is necessary to take into consideration such factors as the width of the radiated pulse, the width of the antenna beam, the amount of attenuation of the electric wave during propagation, the coefficient of reflection of the target, and so on. Actually, however, it is sufficient to consider the length of 600 to 700 m mentioned above. The accuracy of detection of a target having a minimum size is determined by the width of the radiated radar pulse. For example, with a width of 1 $\mu$ sec. for the radiated radar pulse, the resolution in the radial direction will be 150 m. Accordingly, the unit of quantification may be selected to be less than 150 m. In this example, the unit of quantification (one bit) was selected to be equal to 60 m, which corresponds to the unit time of quantification of 0.4 $\mu$ sec. Further, in this example, the quantification number in the radial direction of the unit scanning surface was made to be equal to 11 bits (60 m × 11 = 660 m), and the circuit was fabricated by utilizing a commerical shift register having 512 bits. Accordingly, the data processing range is about 17 nautical miles. It is to be understood that the search distance and the number of bits required for the distance described above may be different depending upon the field of application of the radar system embodying the invention.

In an ordinary radar system, the number of scanning beams is one per 0.1° and the time spacing between adjacent beams is 1.1 ms. The distance in the circumferential direction will now be considered in detail. This distance can be calculated according to the following equation $$D = \frac{2\pi RX}{360} \qquad (1)$$

where D represents the circumferential distance, R the radial distance, and X the angle between adjacent scanning beams. However, from the standpoint of accuracy and fineness of the measurement required for practical use, the spacing between adjacent scanning beams is about 0.3°, so that in the following description it is assumed that the spacing is 0.3° and thus the time spacing is 3.3 ms. Then, where X = 0.3° and R = 1 nautical mile = 1853 m, from equation (1) it can be determined that D = about 10 m. As described above, a length of 60 m in the radial direction was selected as one bit. For the purpose of obtaining the same accuracy also in the circumferential direction, for a radius of 0.5 to 1 nautical mile one out of 8 scanning beams is extracted as the data, because the 0.5 to 1 nautical mile corresponds to the length of 5 to 10 m of an arc subtending the angle 0.3°, that is 60 m x 1/12 to 60 m x 1/6 having an approximate average of 60 m x 1/8.

This corresponds to a percentage of extraction of ⅛. Similarly, in a range having a radius of 1 to 2 nautical miles the beam is extracted at an intermediate of 10 to 20 m (60 m x 1/6 to 60 m x 1/3)

or at a percentage of extraction of ⅓, and in a range having a radius of 4 to 8 nautical miles the beam is extracted at an intermediate of 40 to 80 m (60 m x 2/3 to 60 m x 4/3)

or at a percentage of extraction of ½. Further, in a range having a radius of 8 to 16 nautical miles, the beam is extracted at an intermediate 80 to 160 m (60 m x 4/3 to 60 m x 8/3)

at a percentage of extraction of ½. These parameters are shown in the following table 1.

Table 1

| Distance from the center (nautical mile) | Subtend Angle for unit scanning surface | Angle of one bit | Percentage of extraction |
|---|---|---|---|
| 0 – 0.5 | — | — | — |

Table 1-continued

| Distance from the center (nautical mile) | Subtend Angle for unit scanning surface | Angle of one bit | Percentage of extraction |
|---|---|---|---|
| 0.5 – 1.0 | 26.4° | 2.4° | 1/8 |
| 1.0 – 2.0 | 13.2° | 1.2° | 1/4 |
| 2.0 – 4.0 | 9.9° | 0.9° | 1/3 |
| 4.0 – 8.0 | 6.6° | 0.6° | 1/2 |
| 8.0 – 16.0 | 3.3° | 0.3° | 1/1 |

In this case, a matrix including 11 bits in both the radial direction and the circumferential direction is used for judgement.

Where a radial length of 60 m is selected to correspond to one bit so as to cover the range of about 17 nautical miles by 512 bits the correspondence between the radial direction and the number of bits is shown in the following table 2.

Table 2

| Distance (nautical mile) | Bit number | Percentage of extraction |
|---|---|---|
| 0 – 0.5 | 0 – 16 | — |
| 0.5 – 1.0 | 16 – 32 | 1/8 |
| 1.0 – 2.0 | 32 – 64 | 1/4 |
| 2.0 – 4.0 | 64 – 128 | 1/3 |
| 4.0 – 8.0 | 128 – 256 | 1/2 |
| 8.0 – 16.0 | 256 – 512 | 1/1 |

Figure 13:
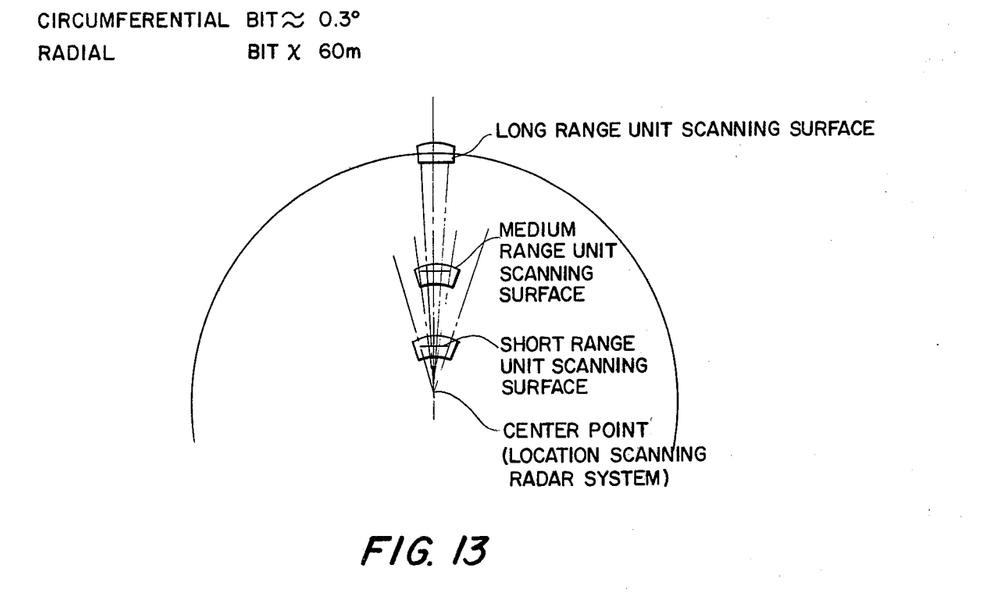
FIG. 13 is a schematic diagram illustrating the normal search range of a polar scanning radar system and shows the manner in which the system is used to search unit scanning surfaces at close range, medium range and long range.

From the foregoing description, it will be appreciated that in order to define a "unit scanning surface" in space, circumferential and radial components are taken into consideration. The circumferential component of a unit scanning surface is divided into 11 circumferential bits, each bit being defined by two adjoining actual radar scanning beams. As discussed above, and listed in Table I on page 9 of the specification, an angle subtended by one circumferential bit will vary with the radial distance from the center (defined by the location of the scanning radar system) thus requiring predetermined extractions of the actual radar scanning line in the processing. Assume for the moment that without extraction, an angle subtended by two adjacent actual radar scanning beams is 0.3°. Consequently, when one out of eight extraction is effected with the system, one circumferential bit will subtend an angle of 0.3° × 8 = 2.4°. In this situation, the angle subtended by the circumferential component of the unit scanning surface then will be 2.4° × 11 = 26.4°. As shown in Table I, one out of eight extraction is employed for a distance range of 0.5 – 1.0 nautical miles. FIG. 13 of the drawings depicts the manner in which a unit scanning surface thus defined can be moved both radially as well as circumferentially. In addition FIG. 13 illustrates the fact that the angle which a target subtends with respect to the center point (location of the scanning radar system), is large when a target of a given size is near the center point whereas it is small when the target is remote from the center point.

Figure 14:
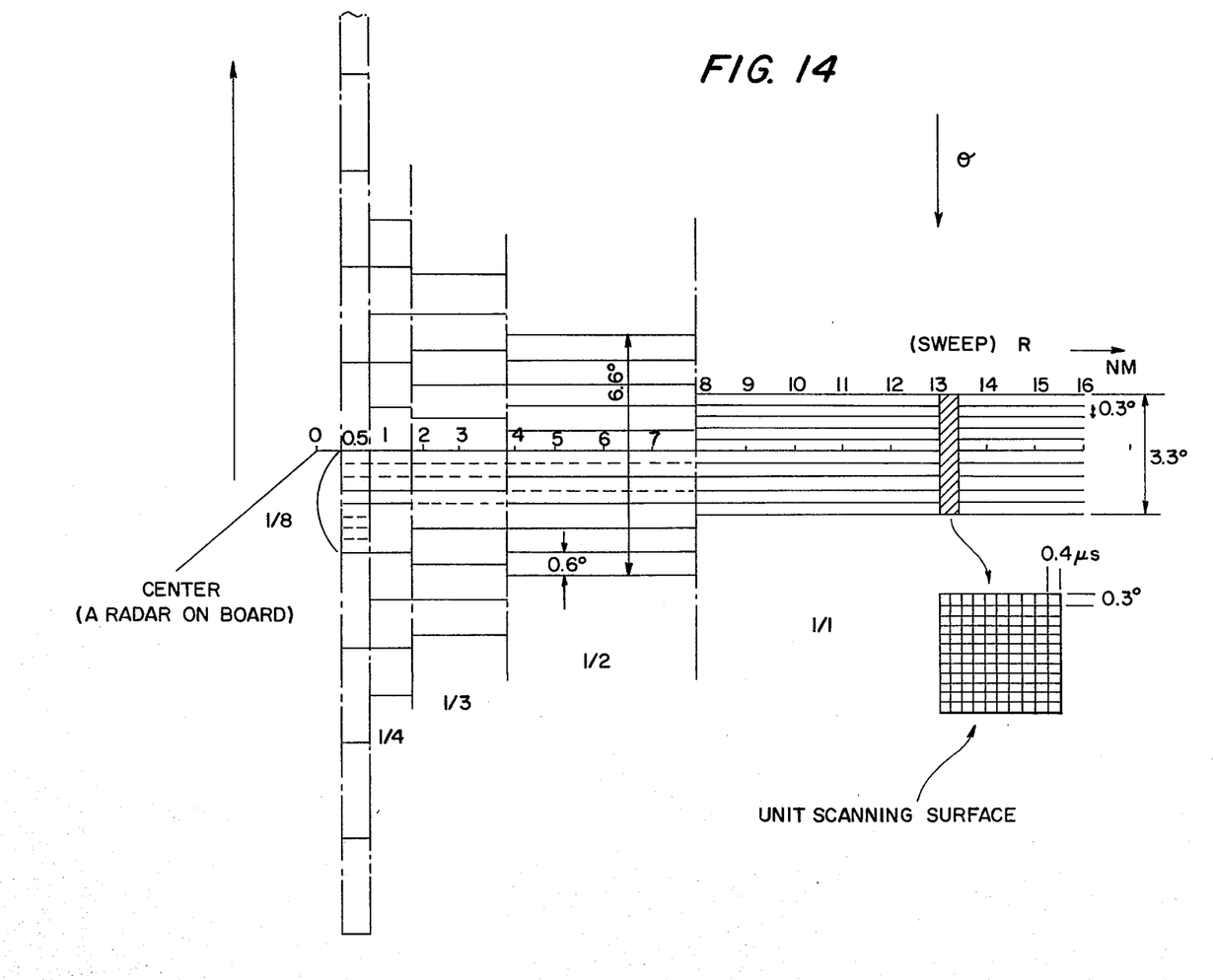
FIG. 14 is a schematic diagram illustrating the manner in which a narrow scanning radar beam produced by the polar scanning radar system illustrated in FIG. 13, is employed to define a unit scanning surface in space.

FIG. 14 is a diagramatical representation developed to illustrate the need for sampled radar scanning beam extraction in accordance with the present invention. From FIG. 14 it will be seen that the unit scanning surface defined in space at a range between 13 and 14 miles from the center, will be composed of a circumferential component that subtends an arc of 3.3° and is comprised of eleven circumferential bits each of which subtends an arc or 0.3° at the center. Thus, it will be seen in FIG. 14 that for the range from 8 to 16 miles one for one extraction is required. At a range of from 4 to 8 miles one out of every two beams is sampled. At a range from 2 to 4 miles one out of every three beams is sampled. At a range from 1 to 2 miles one out of every four beams, and at a range of from 0.5 to 1 mile only one out of every eight beams is sampled in deriving a unit scanning surface.

Figure 15:
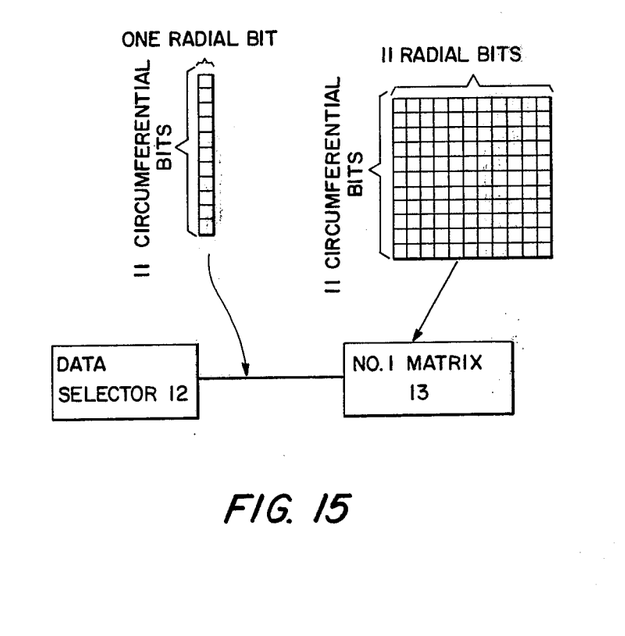
FIG. 15 is a partial schematic block diagram of a part of the returned signal processing system shown in FIG. 3, and illustrates how this part of the system functions to collect signal responses from a unit scanning surface in space for subsequent processing in accordance with the invention.

Similar to the circumferential component, the radial component is divided into eleven radial bits each of which has a range of 60 meters. Thus, the unit scanning surface will cover a range in radial extent of 60 × 11 = 660 meters. The radial bits slide on the radar scanning beams at a rate of 0.4 microseconds. Thus, a unit scanning surface of 11 circumferential bits and 11 radial bits is established in sequence. No extraction is effected in the radial direction. As illustrated in FIG. 15, the data selector 12 transmits in sequence 11 sets of signals corresponding to 11 unit scanning surface circumferential components each consisting of 11 circumferential bits and 1 radial bit. The number one matrix 13 receives these circumferential components sequentially at the 0.4 microsecond radial sliding rate to thereby construct a unit scanning surface consisting of 11 circumferential bits and 11 radial bits as depicted in FIG. 15. By sequentially shifting the circumferential direction and the radial range of the unit scanning surface thus defined in space, pattern identification in accordance with the invention is accomplished.

Figure 3:
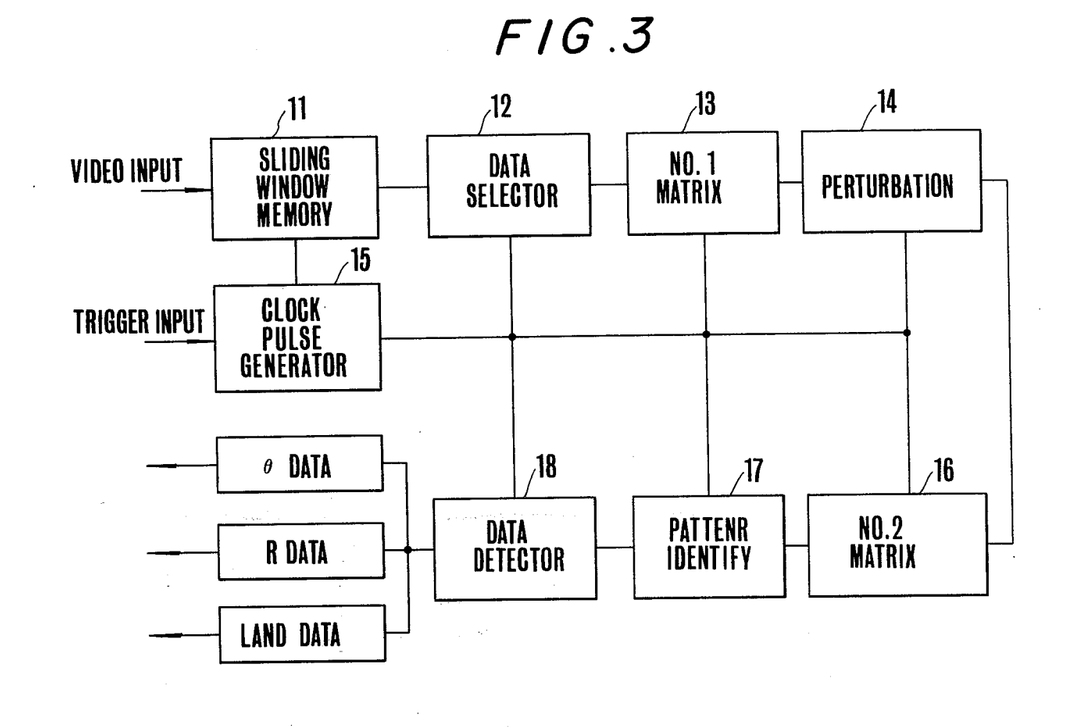
FIG. 3 is a block diagram of an electric system utilized to carry out the method of this invention.

Referring now to FIG. 3, a radar signal pattern identifying system embodying the present invention will be described.

The system generally shown in FIG. 3 comprises a sliding window memory 11 consisting of an assembly of a plurality of memories for recording received signals on respective scanning beams of the radar system and utilized for searching a target by successively scanning the entire surface of the aforementioned unit scanning surface or window (hereinafter termed a window). The received signals are stored in the memory by a clock pulse generated by a clock pulse generator 15. The signals stored in the memory are selected by a data selector 12 and the read out data are written in a first matrix 13 having 11 × 11 bits as described above. The video inputs to the sliding window memory 11 are formed by sampling the output from the video circuit of a radar receiver and as has been pointed out before data in the form of a quantificated video signal is supplied to the video input at every 60 m. The trigger input applied to the clock pulse generator 15 is utilized as the synchronizing signal of this system. Also the clock pulse generator 15 generates various pulses utilized for various operations to be described later.

The sliding window memory 11 utilized in this example comprises 81 shift registers which consist of 512 bits as described above for storing the data of one scanning beam in one shift register. At a percentage of extraction of ⅛, the contents of the 1st, 9th, 17th, . . . 73rd and 81st shift registers are read out by the range gate signals generated by the clock pulse generator and written in the first matrix 13. Similarly, at a percentage of extraction of ¼, the contents of the 1st, 5th, 9th . . . 37th and 41st shift registers, at a percentage of extraction of ⅓, the contents of 1st, 4th, 7th . . . 28th and 31st shift registers, at a percentage of extraction of ½, the contents of 1st, 3rd, 5th, . . . 19th and 21st shift registers and at a percentage of extraction of 1/1, the contents of the first to 11th shift registers are respectively read out and written in the first matrix 13. As can be readily understood from the foregoing description, in this example, some of the shift registers are not utilized for reading out the data. Although the circuit can be constructed to decrease the number of unused circuit elements, it is believed unnecessary to show such specific circuit construction. In the sliding window memory 11, one shift register is used for each scanning beam. As the first scanning beam is successively shifted and stored in the 81st shift register, the data of the 81st scanning beam will be stored in the first shift register. In this manner, when the data have been stored up to 11th shift registers by the action of the gate signal, the data at a percentage of extraction of 1/1, that is those in the range of from 8 to 16 nautical miles will be written in the first matrix 13 and the data will be shifted from left to right in the first matrix at every 60 m. Thus, when up to 21st shift registers have been written, the data at a percentage of extraction of ½, or those in the range of 4 to 8 nautical miles will be written in the first matrix 13. Thereafter, the same process steps are repeated.

Figure 4:
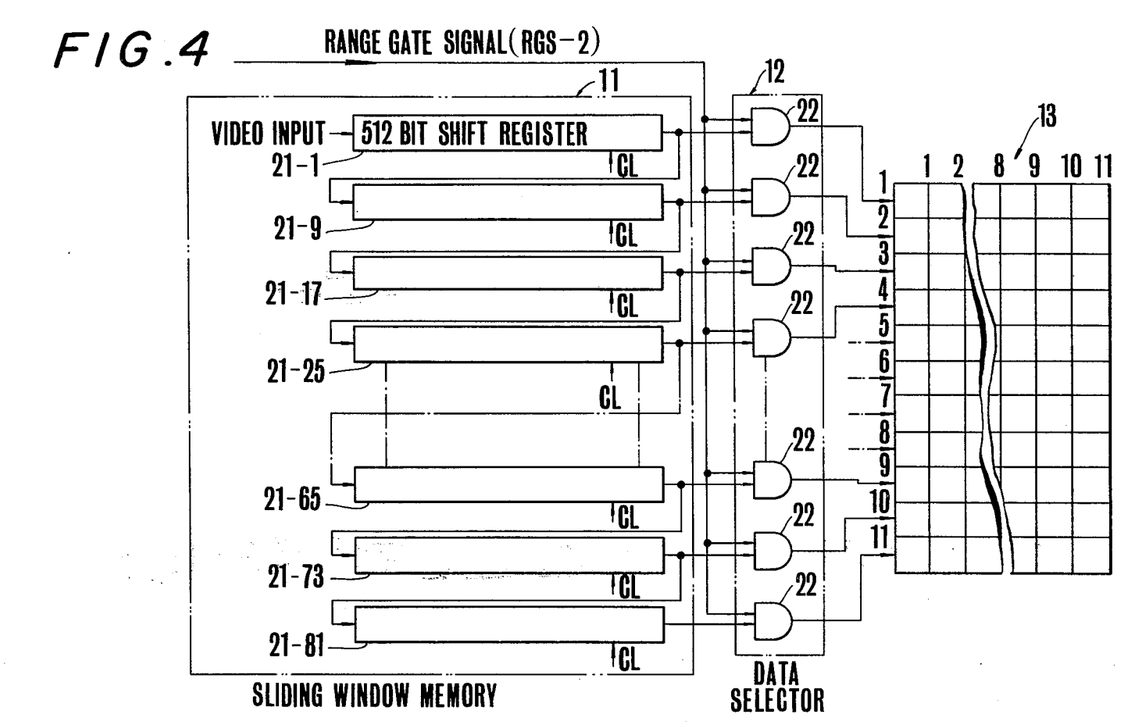
FIG. 4 is a block diagram of a sliding window memory.

FIG. 4 illustrates a circuit construction, for a case in which the percentage of extraction is equal to ⅛. In FIG. 4, symbols 21-1, 21-9 . . . 21-81 show 512 bit shift registers, and the contents of the shift registers are successively shifted by a clock pulse CL having a period of 0.4 $\mu$ sec., thereby storing respective scanning beams corresponding to a percentage of extraction of ⅛ in respective shift registers. The contents of the shift registers are sequentially written in the first matrix by a pulse generated by a range gate signal generator shown in FIG. 5. As shown in FIG. 4 the data selector 12 comprises a plurality of data selection AND gate circuits 22 which are connected to receive at their one inputs the range gate signal RGS-2 generated by the clock pulse generator 15 shown in FIG. 3. In the case shown in FIG. 4, the data which have been stored in 16th to 32nd bits of the shift register, that is those in the range of 0.5 to 1 nautical mile from the center are written in the first matrix while the range gate signal RGS-2 persists in such a manner that 11 data on the same radius will be written in the same column of the first matrix consisting of 11 × 11 bits, and that the data are shifted toward right at every 60 m in the radial direction. Thus, the data covering a range of 60 × 11 = 660 m are written in the first matrix. The data regarding the area close to the center of the scanning surface are written in the right-hand side of the first matrix, those regarding the area remote from the center in the left-hand side and the written data are shifted successively from left to right.

Figure 5:
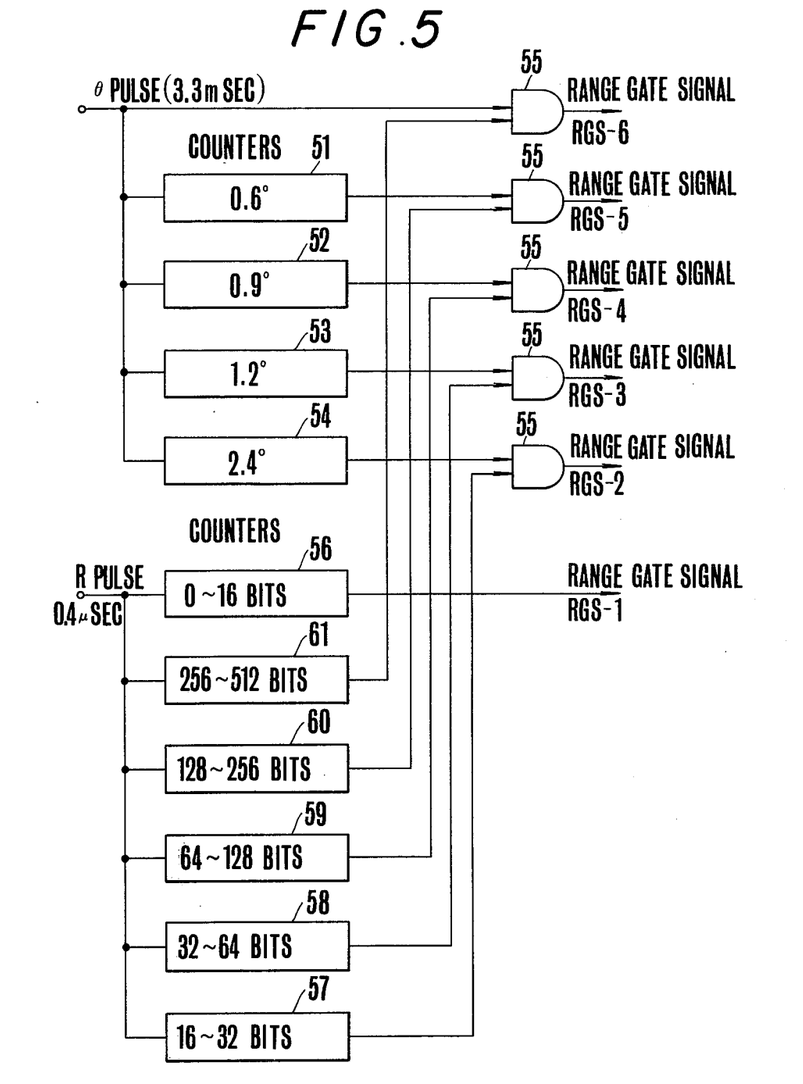
FIG. 5 is a block diagram of a range signal generator.
Figure 6:
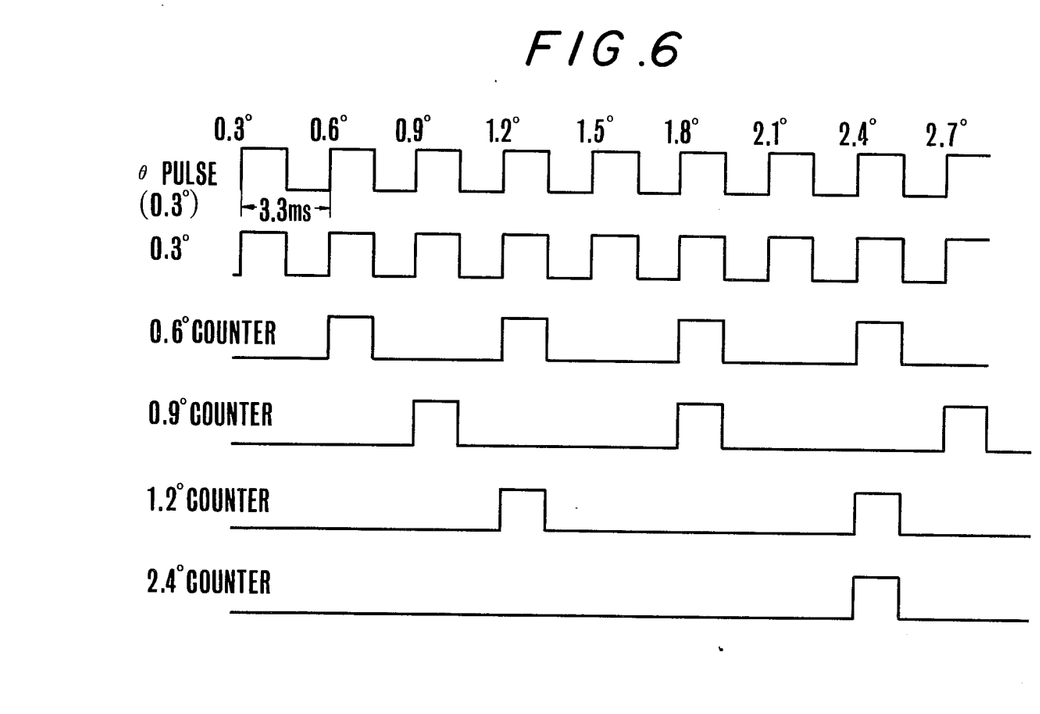
FIGS. 6 and 7 are timing charts of the $\theta$ pulse and the R pulse utilized to form the range gate signals.

The range gate signal generator shown in FIG. 5 operates as follows. A pulse having a recurring period of 3.3 ms is supplied to a $\theta$ pulse input terminal and the recurring frequency of this pulse is reduced to one-half by a 0.6° counter 51, to ⅓ by a 0.9° counter 52, to ¼ by a 1.2° counter 53, and to ⅛ by a 2.4° counter 54. FIG. 6 shows a timing chart of such frequency division operations. On the other hand, a pulse having a recurring period of 0.4 $\mu$sec. is applied to a R pulse input terminal and is successively counted by a 0 - 16 bit counter 56, a 16 - 32 bit counter 57, a 32 - 64 bit counter 58, a 64 - 128 bit counter 59, a 128 - 256 bit counter 60 and a 256 - 512 bit counter 61, respectively. The outputs of these counters are applied to the other inputs of the AND gate in units 55 to form range gate signals RGS-2, RGS-3, . . . RGS-6 which are applied to the data selector 12 in a manner described above thereby selecting the data signals from the sliding window memory 11. The range gate signal RGS-2 corresponds to the portions of the percentages of extraction of ⅛ and the range gate signals RGS-3, RGS-4, RGS-5 and RGS-6 correspond to portions at the percentages of extraction of ¼, ⅓, ½, and 1/1, respectively. The range gate signal RGS-1 corresponds to the portions at 0 to 0.5 nautical mile, but not used in this example.

Figure 7:
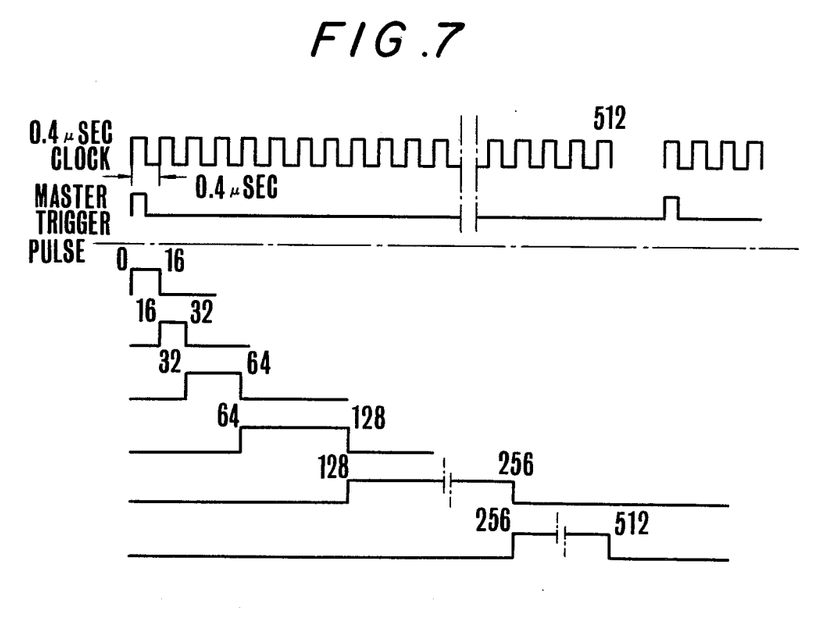

FIG. 7 shows a timing chart for R pulses which are formed by a master trigger pulse.

It is not necessary to inspect all data written in the first matrix 13 but it is necessary to judge the entire state of the window only when a 1 is written in the center of 11 × 11 bits, that is when the signal reflected from a target enters in a region of 60m × 60m corresponding to the center.

Figure 8:
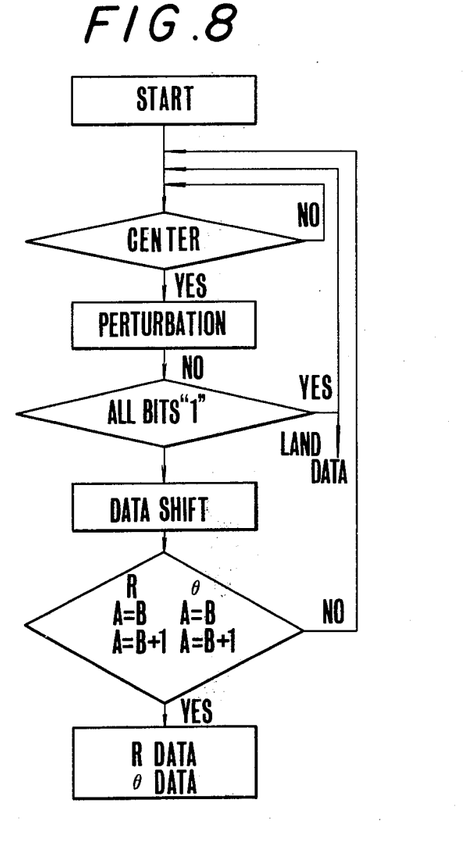
FIG. 8 is a flow chart for explaining the method of this invention.

FIG. 8 shows a flow chart for identifying the pattern. When an 1 is written in the center, an operation termed perturbation is performed for the puspose of simplifying the processing of the data. More particularly, the data in 11 × 11 bits are gathered on four lines, that is a vertical line, a horizontal line and two diagonal lines all crossing each other at the center, for the purpose of assuring ready processing of the data. The purpose of writing the data into the first matrix is to compensate for the loss of a portion of the data caused by the variation in the timing of writing the data or in the signal reflected by a ship or to assure easy judgement where the contour of an island is irregular.

Figure 9A:
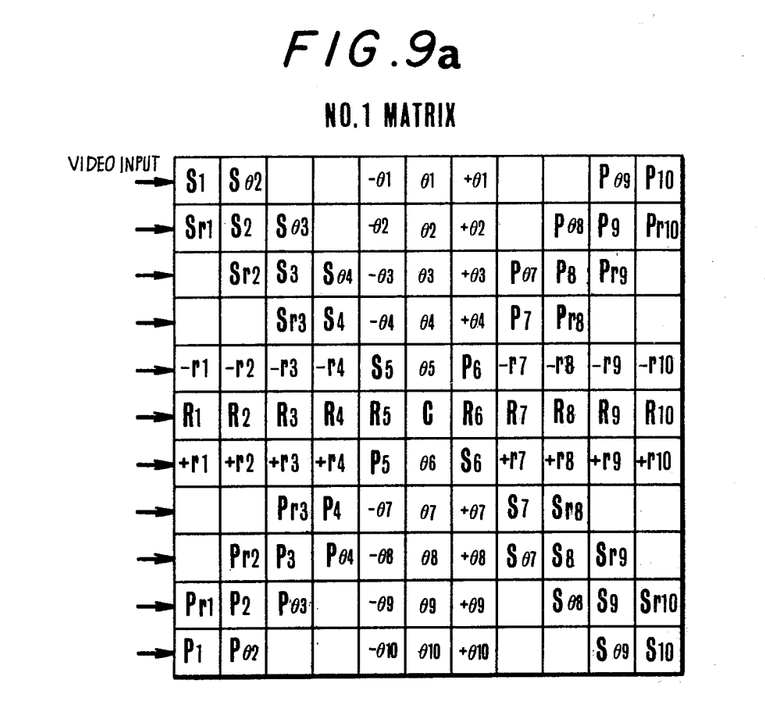
FIGS. 9a and 9b are graphs for explaining the perturbation.
Figure 9B:
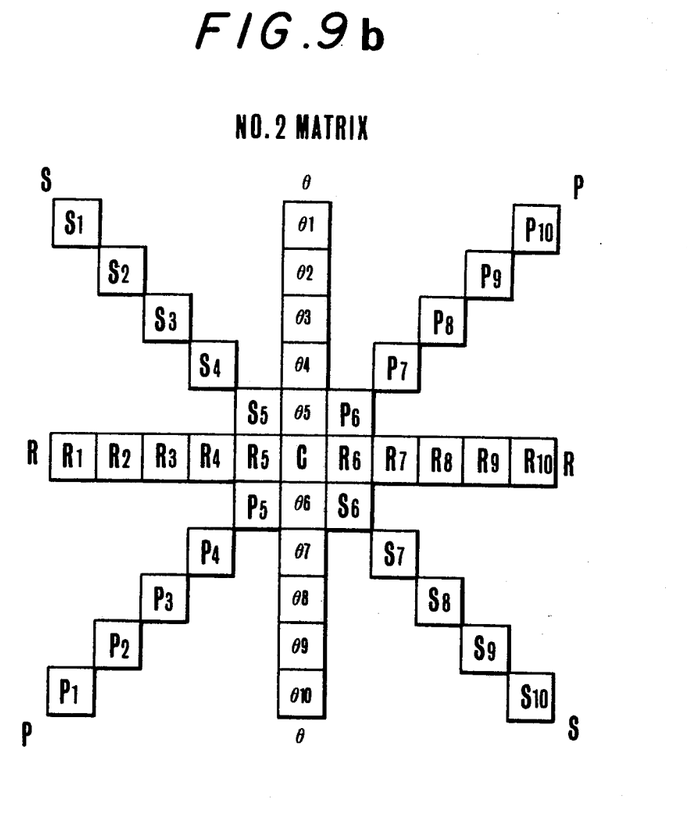
Figure 10:
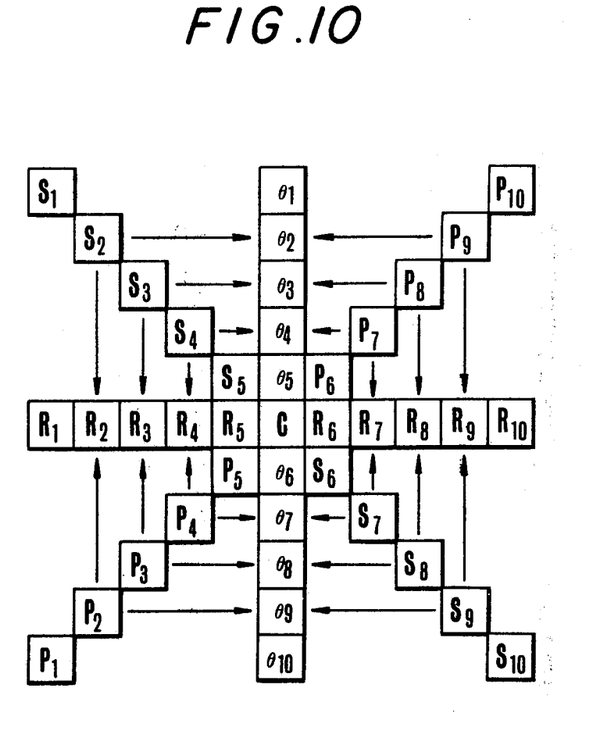
FIG. 10 is a graph for explaining a manner of shifting data.

The perturbation is preformed in the following manner. FIG. 9a shows a graph in which symbols are applied to respective blocks of the first matrix for indicating the locations thereof. FIG. 9b shows a graph in which symbols are applied to respective blocks of the second matrix 16 in which the data after perturbation are written. Transfer of the data from the first matrix 13 to the second matrix 16 is carried out such that where a 1 is stored in any one of the blocks or bits $R_2$, $R_3$, $-r_3$, $+r_3$ of the first matrix in the directions of R and $\theta$ a 1 is written in the block $R_3$ of the second matrix 16. With regard to the directions S and P, where a 1 is stored in any one of the blocks $Sr_2$, $S_2$ and $S\theta_3$ of the first matrix a 1 is written in the block $S_3$ in the second matrix 16. In both directions R and $\theta$, and S and P, the data are first transferred into the blocks on the outer side then into the blocks closer to the center. The following Table 3 shows correspondence of the blocks in the first matrix and the blocks in the second matrix for the entire blocks of a window having 11 × 11 blocks or bits.

Table 3

| First matrix | | | | First matrix | | Second matrix | Second matrix | |
|---|---|---|---|---|---|---|---|---|
| — | $-r_1$ | $R_1$ | $+r_1$ | $R_1$ | — | $S_1$ | — | $S_1$ |
| $R_1$ | $-r_2$ | $R_2$ | $+r_2$ | $R_2$ | $Sr_1$ | $S_2$ | $S\theta_2$ | $S_2$ |
| $R_2$ | $-r_3$ | $R_3$ | $+r_3$ | $R_3$ | $Sr_2$ | $S_3$ | $S\theta_3$ | $S_3$ |
| $R_3$ | $-r_4$ | $R_4$ | $+r_4$ | $R_4$ | $Sr_3$ | $S_4$ | $S\theta_4$ | $S_4$ |

Table 3-continued

| First matrix | | Second matrix | | First matrix | | Second matrix | |
|---|---|---|---|---|---|---|---|
| $R_4$ | $S_5$ | $R_5$ | $P_5$ | $R_5$ | $-r_4$ | $S_5$ | $-\theta_4$ | $S_5$ |
| $R_7$ | $P_6$ | $R_6$ | $S_6$ | $R_6$ | $-\theta_7$ | $S_6$ | $+r_7$ | $S_6$ |
| $R_8$ | $-r_7$ | $R_7$ | $+r_7$ | $R_7$ | $S\theta_7$ | $S_7$ | $Sr_8$ | $S_7$ |
| $R_9$ | $-r_8$ | $R_8$ | $+r_8$ | $R_8$ | $S\theta_8$ | $S_8$ | $Sr_9$ | $S_8$ |
| $R_{10}$ | $-r_9$ | $R_9$ | $+r_9$ | $R_9$ | $S\theta_9$ | $S_9$ | $Sr_{10}$ | $S_9$ |
| — | $-r_{10}$ | $R_{10}$ | $+r_{10}$ | $R_{10}$ | — | $S_{10}$ | — | $S_{10}$ |
| — | $-\theta_1$ | $\theta_1$ | $+\theta_1$ | $\theta_1$ | — | $P_1$ | — | $P_1$ |
| $\theta_1$ | $-\theta_2$ | $\theta_2$ | $+\theta_2$ | $\theta_2$ | $Pr_1$ | $P_2$ | $P\theta_2$ | $P_2$ |
| $\theta_2$ | $-\theta_3$ | $\theta_3$ | $+\theta_3$ | $\theta_3$ | $Pr_2$ | $P_3$ | $P\theta_3$ | $P_3$ |
| $\theta_3$ | $-\theta_4$ | $\theta_4$ | $+\theta_4$ | $\theta_4$ | $Pr_3$ | $P_4$ | $P\theta_4$ | $P_4$ |
| $\theta_4$ | $S_5$ | $\theta_5$ | $P_6$ | $\theta_5$ | $-r_4$ | $P_5$ | $-\theta_7$ | $P_5$ |
| $\theta_7$ | $p_5$ | $\theta_6$ | $S_6$ | $\theta_6$ | $+\theta_4$ | $P_6$ | $-r_7$ | $P_6$ |
| $\theta_8$ | $-\theta_7$ | $\theta_7$ | $+\theta_7$ | $\theta_7$ | $P\theta_7$ | $P_7$ | $Pr_8$ | $P_7$ |
| $\theta_9$ | $-\theta_8$ | $\theta_8$ | $+\theta_8$ | $\theta_8$ | $P\theta_8$ | $P_8$ | $Pr_9$ | $P_8$ |
| $\theta_{10}$ | $-\theta_9$ | $\theta_9$ | $+\theta_9$ | $\theta_9$ | $P\theta_9$ | $P_9$ | $Pr_{10}$ | $P_9$ |
| — | $-\theta_{10}$ | $\theta_{10}$ | $+\theta_{10}$ | $\theta_{10}$ | — | $P_{10}$ | — | $P_{10}$ |

By the perturbation process described above the data are transferred into the second matrix. Then when a 1 is written in any one of the blocks in the directions of R, $\theta$, S and P of the second matrix as shown by the flow chart shown in FIG. 8, the target is identified to have length longer then 11 bits that is 660m. In such a case, the target is identified as a land the succeeding step in the flow chart is not performed.

Where any one of the blocks in the directions of R, $\theta$, S and P is not written with 1, the next step of data shifting shown in the flow chart of FIG. 8 is performed, in which the data in the directions of S and P are transferred to the positions in the directions of R and $\theta$ for the purpose of further simplifying the processing of the data in the directions of R, $\theta$, S and P. During the transfer of the data from the first matrix to the second matrix described above a total of 121 blocks of the matrix were reduced to 41 blocks, but by the process just described the number of the blocks is reduced to 21 blocks in the directions of R and $\theta$. The reason that the data are written in directions R and $\theta$ alone in the second matrix is to avoid the possibility of ignoring the data stored in the blocks in the directions of S and P, for example to misjudge a long target in the direction of S. There is no such misjudgement when the data are shifted after perturbation. The purpose of data shift is to shift the data in the directions of S and P to the blocks in the directions K and $\theta$ in a manner as shown in FIG. 2. For example, with regard to the direction S, when data having a length of 9 bits, that is the center bit plus four bits on the opposite sides of the center are written in the direction of S, the data can be shifted to the directions R and $\theta$ by shifting data having a length of 9 bits, that is the center bit plus 4 bits on both sides of the center to both directions R and $\theta$. The data shifting can be performed in the same manner also in the direction of P. To perform such shifting, the circuit is constructed such that the signals from the positions corresponding to the respective matrix positions, for example signals corresponding to $S_2$, $R_2$ and $P_2$, are gathered together by OR gate circuits and if 1 presents the OR gate circuits produce an 1 output which is to be written in the bit $R_2$. When the circuit is constructed in this manner, the data in the directions of R, $\theta$, S and P are shifted in the directions of R and $\theta$ for identifying the center bit. Such identification is performed at the same time for both directions of R and $\theta$ and when the center is found, both R data and $\theta$ data can be obtained.

Figure 11:
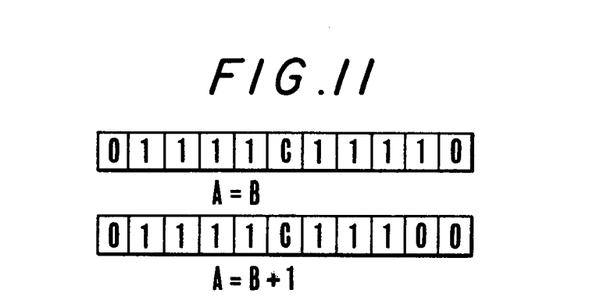
FIG. 11 is a graph utilized to judge a center.
Figure 12:
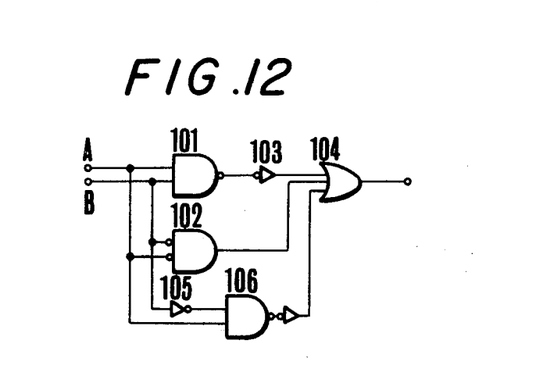
FIG. 12 is a connection diagram of a circuit utilized to judge the center.

The identification of the center is performed in the following manner. In this embodiment the identification of the center is performed when A=B and A=B+1 as shown in FIG. 11 and the R and $\theta$ data under these conditions are read out. An example of the circuit for performing such identification is illustrated in FIG. 12. The circuit shown in FIG. 12 comprises three AND gate circuits 101, 102 and 106, inverters 103 and 105 and an OR gate circuit 104 which are connected as shown. Where A=B=1, the OR gate circuit 104 produces a 1 output through a circuit including AND gate circuits 101 and 102 and OR gate circuit 104. Where A=B=0, the OR gate circuit 104 produces a 1 output through a circuit including AND gate circuit 102 and OR gate circuit 104. Further where A=B+1, the OR gate circuit 104 produces an 1 output through a circuit including inverter 105, AND gate circuit 106 and OR gate circuit 104. In another case the OR gate circuit 104 produces a 0 output, identification of the center can be performed by connecting the outputs of the bits which are symmetrically positioned with respect to the center to the input terminals A and B respectively, by connecting all symmetrical pairs of the bits in the directions of R and $\theta$ also in symmetrical pairs and by connecting all these outputs to the input of an OR gate circuit for judging the presence or absence of an output from this OR gate circuit.

In this manner the pattern is identified to obtain R data and $\theta$ data. At the same time the position of the target on the entire scanned area can be correctly located.

What is claimed is:

1. A method of processing a pattern of returned target signals for a polar scanning type radar system comprising establishing a unit scanning surface which is bounded by two scanning beam radii spaced from each other a predetermined angle and two circular arcs spaced from each other a predetermined distance in the radial direction in a scanning plane of the polar scanning type radar system, said polar scanning type radar system employing a plurality of actual scanning beams which are sampled for target information, the size of said unit scanning surface being determined by the nature and size of targets to be identified by the radar system such that a target corresponding to a received pattern of target signals from said unit scanning surface can be judged from the size of said pattern, said unit scanning surface being shifted progressively in the radial and circumferential directions to search an area for received patterns of target signals and providing a means for judging the target, said method of processing the received pattern of target signals further comprising the steps of dividing the surface of a target area being searched by the radar system into a plurality of annular search sections defined by a plurality of concentric circles having increasing radii measured from a center that identifies the location of the radar system, sequentially scanning a plurality of unit scanning surfaces each having substantially the same annular search section area over the entire surface of a target area being searched by the radar system, recording the received pattern of target signals in a memory in such a manner that the ratio of the number of sampled scanning beams to the number of actual scanning beams is a maximum when scanning an annular search section which is located most remotely from the center, gradually decreasing the percentage of extraction of sampled scanning beams of annular search sections closest to the center, so that the percentage of extraction becomes a minimum of $1/n$ (where n is an integer) while scanning an annular search section closest to the center, each unit scanning surface being sequentially scanned with an actual scanning beam at equal increments in both the radial and circumferential directions and at substantially equal spacing so as to obtain a pattern of the received target signals in accordance with the presence or absence of a target, and judging said target in accordance with the size of said pattern of received target signals.

2. The method according to claim 1 wherein substantially all of the received signals from each unit scanning surface are arranged in a pattern consisting of a circumferential line passing through a center of the unit scanning surface, a radial line passing through the center of the unit scanning surface and two diagonal lines also passing through the center of the unit scanning surface, and the target is judged from the size of said pattern.

3. The method according to claim 2 wherein the received signals arranged in said four lines are rearranged into another pattern consisting of a line in the circumferential direction and a line in the radial direction, and the target is judged from the size of said another pattern.

4. The method according to claim 3 wherein the centers of said two lines in the circumferential and radial directions are coincident with the center of the unit scanning surface, and the target is judged and the position thereof is located from the length of the pattern in said two directions upon all three centers of the unit scanning surface identified in claim 2 becoming coincident.

* * * * *